United States Patent
Chen et al.

(10) Patent No.: US 12,555,056 B2
(45) Date of Patent: Feb. 17, 2026

(54) SAMPLE TRACKING WORKFLOW AND METHOD

(71) Applicant: Dionex Corporation, Sunnyvale, CA (US)

(72) Inventors: Yongjing Chen, Santa Clara, CA (US); Yan Liu, Palo Alto, CA (US); Husam Al-Esawi, El Dorado Hills, CA (US)

(73) Assignee: Dionex Corporation, Sunnyvale, CA (US)

( * ) Notice: Subject to any disclaimer, the term of this patent is extended or adjusted under 35 U.S.C. 154(b) by 208 days.

(21) Appl. No.: 18/360,586

(22) Filed: Jul. 27, 2023

(65) Prior Publication Data

US 2025/0037053 A1  Jan. 30, 2025

(51) Int. Cl.
  *G06Q 10/0633* (2023.01)
  *G06V 30/224* (2022.01)
  *G08B 21/18* (2006.01)

(52) U.S. Cl.
  CPC ....... *G06Q 10/0633* (2013.01); *G06V 30/224* (2022.01); *G08B 21/18* (2013.01)

(58) Field of Classification Search
  CPC .... G06Q 10/00–50/00; G06V 10/00–2201/00; G08B 1/00–31/00
  USPC .................................................. 705/7.11–7.42
  See application file for complete search history.

(56) References Cited

U.S. PATENT DOCUMENTS

| | | | |
|---|---|---|---|
| 9,424,398 B1 | 8/2016 | McLeod et al. | |
| 11,175,297 B2 | 11/2021 | Wiederin et al. | |
| 12,290,816 B2 * | 5/2025 | Blair | G06K 7/10356 |
| 2001/0032060 A1 * | 10/2001 | Markidan | G06Q 10/10 702/182 |
| 2007/0096907 A1 * | 5/2007 | Jam | G06Q 10/10 340/8.1 |
| 2009/0322486 A1 * | 12/2009 | Gerstel | B65G 1/1371 340/10.1 |
| 2012/0314954 A1 * | 12/2012 | Moore | H04N 1/32144 235/375 |
| 2015/0006212 A1 * | 1/2015 | Covely | G06Q 10/06311 705/7.13 |
| 2015/0136604 A1 * | 5/2015 | Nielsen | B01F 33/30 204/453 |
| 2018/0180635 A1 * | 6/2018 | Lapham | G01N 35/0099 |
| 2021/0025906 A1 * | 1/2021 | Leboudec | G05B 19/0426 |
| 2021/0270859 A1 | 9/2021 | Ferrara | |
| 2021/0270864 A1 | 9/2021 | Chiappetta et al. | |
| 2021/0311082 A1 | 10/2021 | Tesluk et al. | |

FOREIGN PATENT DOCUMENTS

| | | | | |
|---|---|---|---|---|
| WO | WO-2004057307 A1 * | 7/2004 | | G01N 35/00732 |
| WO | WO-2007137750 A1 * | 12/2007 | | G16H 10/40 |

* cited by examiner

*Primary Examiner* — Alan S Miller (74) *Attorney, Agent, or Firm* — Michael Best & Friedrich LLP (57) ABSTRACT

Disclosed herein are scientific instrument support systems, as well as related methods, computing devices, and computer-readable media. For example, in some embodiments, samples are tracked using unique identifiers. An autosampler may detect the samples using unique identifiers and provide alerts when the sample is placed in the wrong location or when an incorrect or incompatible workflow is selected for the sample.

19 Claims, 8 Drawing Sheets

| # | Mini-plot | Name | Type | Volume (µL) | Instrument Method | Process Method | Status | Sample Manager |
|---|---|---|---|---|---|---|---|---|
| | *902* | *904* | *906* | *908* | | | *910* | *912* |
| 1 |  | *******86 | Unkown | 20 | ICE-AS1-MSA-Sulfite | Sulfite | Finished |  |
| 2 |  | *******87 | Unkown | 20 | ICE-AS1-MSA-Sulfite | Sulfite | Finished |  |
| 3 | | *******88 | Unkown | 20 | ICE-AS1-MSA-Sulfite | Sulfite | Skipped |  |
| 4 | | *******89 | Unkown | 20 | ICE-AS1-MSA-Sulfite | Sulfite | Finished |  |

FIG. 9

SAMPLE TRACKING WORKFLOW AND METHOD

BACKGROUND

Scientific instruments are used in labs to analyze samples of substances, for example, soil, blood, or the like. A large sample of the substance is received by the lab, which is then divided into batches (e.g., aliquots) for individual analysis. The batches are often pre-treated for a scientific measurement and provided to the scientific instrument for analysis using chromatography, spectrometry, or the like.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Samples are usually tracked manually by a chemist. For example, a chemist divides each sample into one or more vials and attaches handwritten labels to the vials. These samples and vials are then tracked in a physical notebook maintained by the chemist and manually entered into various scientific instrument support applications or software. Vials may also be loaded into scientific instruments or autosamplers of scientific instruments. The position and experiment conducted on each vial may also be manually tracked by the chemist.

The scientific instrument support embodiments disclosed herein may achieve improved performance relative to conventional approaches. For example, samples can be carefully tracked across the laboratory through the various experiments and analysis to prevent any human errors. A chain of custody may be developed by tracking the sample to identify and audit the lifecycle of the sample through the laboratory. The embodiments disclosed herein thus provide improvements to scientific instrument technology (e.g., improvements in the computer technology supporting such scientific instruments, among other improvements).

Among other things, various ones of the embodiments disclosed herein may provide improvements to sample processing and resource usage by tracking a sample through a laboratory and confirming, prior to running an experiment on the sample, that the correct sample is being used with the correct instrument for the correct type of experiment. For example, conventional systems may provide a graphical user interface (GUI) that prompts a user to manually enter a position in an autosampler and a corresponding workflow for the entered position. However, these conventional systems suffer from a number of technical problems and limitations, including not being able to track and provide warnings when vials are placed in incorrect positions, when incompatible or incorrect workflows are selected for the vials, or the like.

Various ones of the embodiments disclosed herein may improve upon conventional approaches to achieve the technical advantages of data validation, improved user control, and improved user error prevention by tracking samples and providing warnings when incompatible workflows are selected or when samples are mishandled. Such technical advantages are not achievable by routine and conventional approaches, and all users of systems including such embodiments may benefit from these advantages (e.g., by assisting the user in the performance of a technical task, such as scientific analysis of samples (e.g., chromatography analysis), by means of a guided human-machine interaction process). The technical features of the embodiments disclosed herein are thus decidedly unconventional in the field of scientific analysis of samples, as are the combinations of the features of the embodiments disclosed herein.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising." "including." "having." and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

Figure 1:
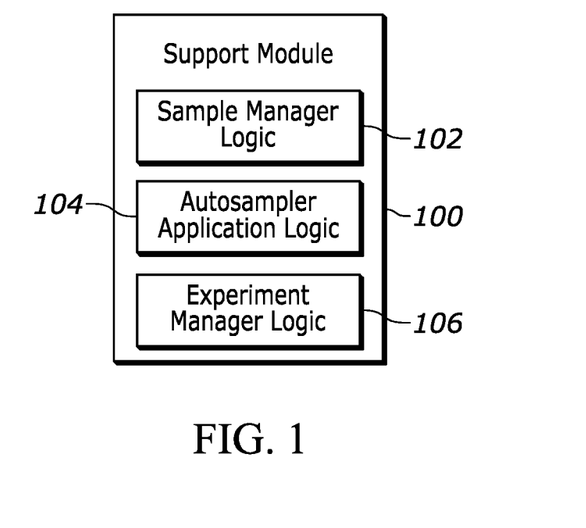
FIG. 1 is a block diagram of an example scientific instrument support module for performing support operations, in accordance with various embodiments.

FIG. 1 is a block diagram of a scientific instrument support module 100 for performing support operations, in accordance with various embodiments. The scientific instrument support module 100 may be implemented by circuitry (e.g., including electrical and/or optical components), such as a programmed computing device. The logic of the scientific instrument support module 100 may be included in a single computing device or may be distributed across multiple computing devices that are in communication with each other as appropriate. Examples of computing devices that may, singly or in combination, implement the scientific instrument support module 100 are discussed herein with reference to the computing device 300 of FIG. 3, and examples of systems of interconnected computing devices, in which the scientific instrument support module 100 may be implemented across one or more of the computing devices, is discussed herein with reference to the scientific instrument support system 400 of FIG. 4.

The scientific instrument support module 100 may include sample manager logic 102, autosampler application logic 104, and experiment manager logic 106. As used herein, the term "logic" may include an apparatus that is to perform a set of operations associated with the logic. For example, any of the logic elements included in the scientific instrument support module 100 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

The sample manager logic 102 may collect and manage information pertaining to samples. The sample manager logic 102 may generate graphical user interface (GUI), such as GUI 200 (FIG. 2), that receives user-provided information relating to a sample. The information may include a description of the sample, the date the sample was collected, the date the sample was received at the laboratory, the due date of the analysis results, the storage conditions of the sample, the storage location(s) of the samples, the types of experiments or analyses to be performed on the sample, the operator responsible for the sample, and/or the like. The sample manager logic 102 may also generate a unique identifier for each sample. In some examples, a separate unique identifier may be generated for each aliquot of a received sample. In other examples, the sample may have a unique identifier and additional unique identifier for each aliquot of the sample may be generated by appending characters to the unique identifier of the sample. The sample manager logic 102 stores the unique identifiers for the samples in correlation with the information received for the samples in a sample database (for example, in the storage device 304, 404). The stored information can be later retrieved by the sample manager logic 102 and other applications from the sample database.

The autosampler application logic 104 may manage the functions of the autosampler of a scientific instrument. In the following description, the autosampler is described with respect to an ion chromatograph (IC) as the scientific instrument to facilitate a simplified discussion. However, it would be apparent to a person of ordinary skill in the art that the discussion is equally application to an autosampler or similar device of a different scientific instrument (for example, a gas chromatograph, a liquid chromatograph, and/or the like). The autosampler application logic 104 manages the sequence of operations within an autosampler including receiving information pertaining to vials placed in the autosampler. The information pertaining to the vials includes, for example, unique identifiers of the sample, a position of the sample within the autosampler, the type of workflow to be performed on the sample, and the like. In response to receiving the information, the autosampler application logic 104 may determine whether the vials are placed in the correction positions, determine whether the workflow information provided for the sample matches the workflow to be performed on the sample, and/or the like. The autosampler application logic 104 may also control the autosampler to scan the vails and to control the sample injection mechanism to collect the samples for analysis by the scientific instrument.

Figure 2:
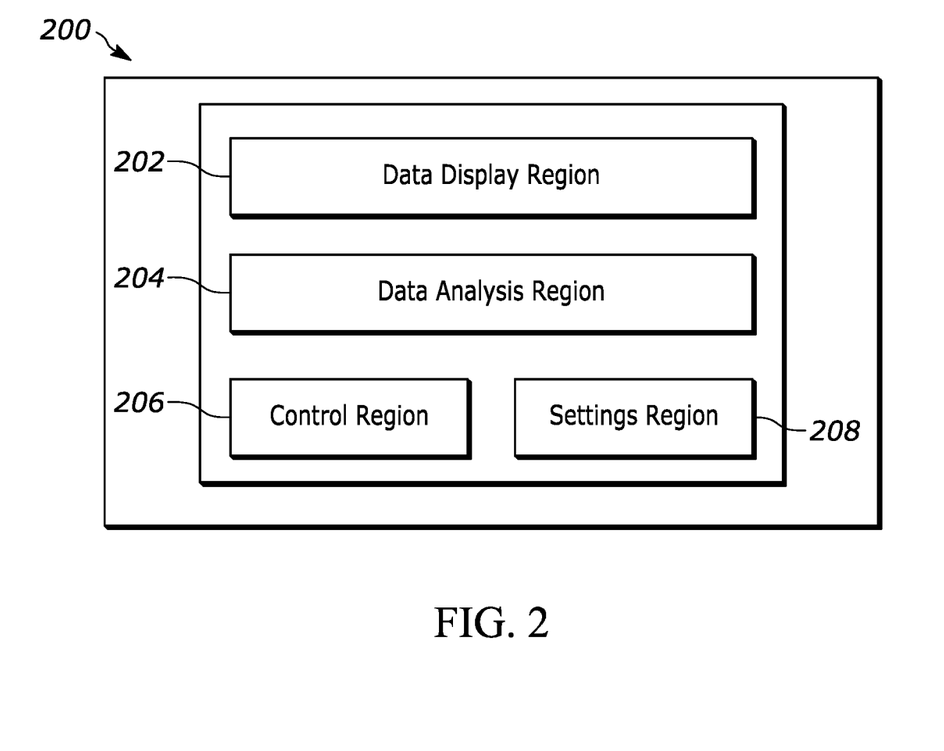
FIG. 2 is an example of a graphical user interface that may be used in the performance of some or all of the support methods disclosed herein, in accordance with various embodiments.

The experiment manager logic 106 may manage a type of experiment being performed on a sample. The type of experiment may be defined based on input received from an end-user, and may be, for example, a gas chromatography analysis, a liquid chromatography analysis, an ion chromatography analysis, or the like. Each type of experiment may have various analytes and corresponding workflows associated with the experiment. A workflow is a series of steps that are to be performed by the scientific instrument to complete the experiment. The analytes and the workflows may be selectable via a graphical user interface (GUI), such as GUI 200 (FIG. 2). For example, in some embodiments, corresponding workflows are displayed on a GUI 200 based on an analyte selected by a user. The experiment manager logic 106 may manage data and processes performed via a scientific instrument, such as scientific instrument 410 (FIG. 4), and a computing device, such as at least one of user local computing device 420, service local computing device 430, and remote computing device 440 (FIG. 4) based on a workflow and/or experiment type selected (e.g., via one or more GUIs 200).

Figure 3:
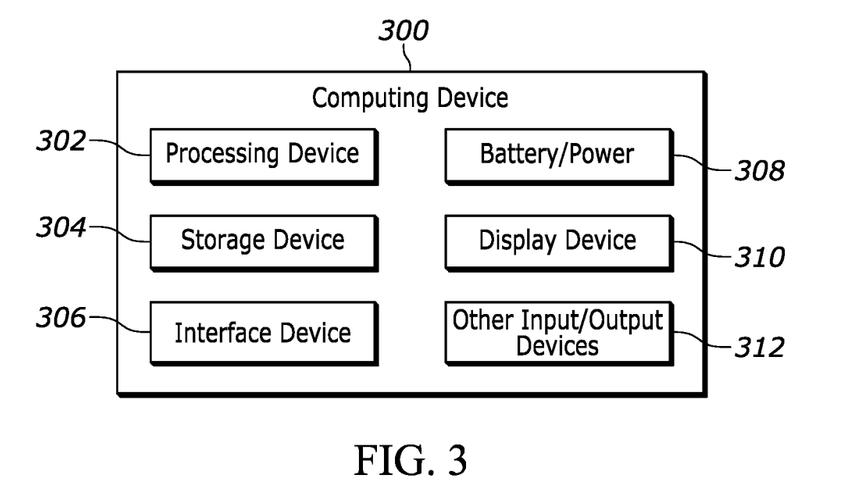
FIG. 3 is a block diagram of an example computing device that may perform some or all of the scientific instrument support methods disclosed herein, in accordance with various embodiments.
Figure 4:
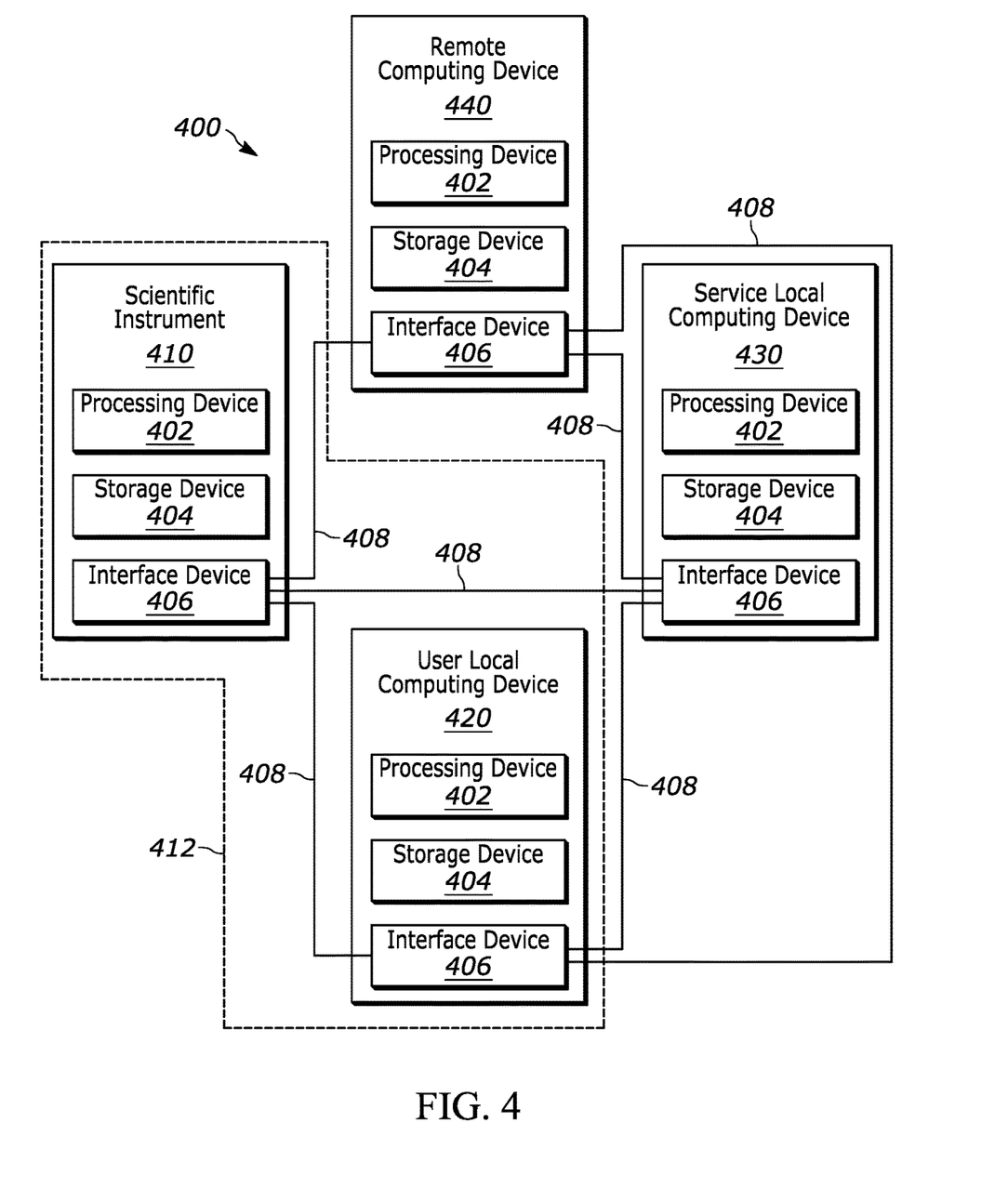
FIG. 4 is a block diagram of an example scientific instrument support system in which some or all of the scientific instrument support methods disclosed herein may be performed, in accordance with various embodiments.

The scientific instrument support methods disclosed herein may include interactions with a human user (e.g., via the user local computing device 420 discussed herein with reference to FIG. 4). These interactions may include providing information to the user (e.g., information regarding the operation of a scientific instrument such as the scientific instrument 410 of FIG. 4, information regarding a sample being analyzed or other test or measurement performed by a scientific instrument, information retrieved from a local or remote database, or other information) or providing an option for a user to input commands (e.g., to control the operation of a scientific instrument such as the scientific instrument 410 of FIG. 4, or to control the analysis of data generated by a scientific instrument), queries (e.g., to a local or remote database), or other information. In some embodiments, these interactions may be performed through a graphical user interface (GUI) that includes a visual display on a display device (e.g., the display device 310 discussed herein with reference to FIG. 3) that provides outputs to the user and/or prompts the user to provide inputs (e.g., via one or more input devices, such as a keyboard, mouse, trackpad, or touchscreen, included in the other I/O devices 312 discussed herein with reference to FIG. 3). The scientific instrument support systems disclosed herein may include any suitable GUIs for interaction with a user.

FIG. 2 depicts an example GUI 200 that may be used in the performance of some or all of the support methods disclosed herein, in accordance with various embodiments. As noted above, the GUI 200 may be provided on a display device (e.g., the display device 310 discussed herein with reference to FIG. 3) of a computing device (e.g., the computing device 300 discussed herein with reference to FIG. 3) of a scientific instrument support system (e.g., the scientific instrument support system 400 discussed herein with reference to FIG. 4), and a user may interact with the GUI 200 using any suitable input device (e.g., any of the input devices included in the other I/O devices 312 discussed herein with reference to FIG. 3) and input technique (e.g., movement of a cursor, motion capture, facial recognition, gesture detection, voice recognition, actuation of buttons, etc.).

The GUI 200 may include a data display region 202, a data analysis region 204, a scientific instrument control region 206, and a settings region 208. The particular number and arrangement of regions depicted in FIG. 2 is simply illustrative, and any number and arrangement of regions, including any desired features, may be included in a GUI 200.

The data display region 202 may display data generated by a scientific instrument (e.g., the scientific instrument 410 discussed herein with reference to FIG. 4). For example, the data display region 202 may display data pertaining to an experiment currently being performed, an analyte being analyzed, or information pertaining to the sample being analyzed.

The data analysis region 204 may display the results of data analysis (e.g., the results of analyzing the data illustrated in the data display region 202 and/or other data). For example, the data analysis region 204 may display the results of a chromatography analysis, a spectrometry analysis, or the like. In some embodiments, the data display region 202 and the data analysis region 204 may be combined in the GUI 200 (e.g., to include data output from a scientific instrument, and some analysis of the data, in a common graph or region).

The scientific instrument control region 206 may include options that allow the user to control a scientific instrument (e.g., the scientific instrument 410 discussed herein with reference to FIG. 4). For example, the scientific instrument control region 206 may include control features of a chromatograph.

The settings region 208 may include options that allow the user to control the features and functions of the GUI 200 (and/or other GUIs) and/or perform common computing operations with respect to the data display region 202 and data analysis region 204 (e.g., saving data on a storage device, such as the storage device 304 discussed herein with reference to FIG. 3, sending data to another user, labeling data, etc.). For example, the settings region 208 may include options on how to display sample information and/or how to handle errors as further discussed below.

As noted above, the scientific instrument support module 100 may be implemented by one or more computing devices. FIG. 3 is a block diagram of a computing device 300 that may perform some or all of the scientific instrument support methods disclosed herein, in accordance with various embodiments. In some embodiments, the scientific instrument support module 100 may be implemented by a single computing device 300 or by multiple computing devices 300. Further, as discussed below, a computing device 300 (or multiple computing devices 300) that implements the scientific instrument support module 100 may be part of one or more of the scientific instrument 410, the user local computing device 420, the service local computing device 430, or the remote computing device 440 of FIG. 4.

The computing device 300 of FIG. 3 is illustrated as having a number of components, but any one or more of these components may be omitted or duplicated, as suitable for the application and setting. In some embodiments, some or all of the components included in the computing device 300 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 302 and one or more storage devices 304). Additionally, in various embodiments, the computing device 300 may not include one or more of the components illustrated in FIG. 3, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 300 may not include a display device 310, but may include display device interface circuitry (e.g., a connector and driver circuitry) to which a display device 310 may be coupled.

The computing device 300 may include a processing device 302 (e.g., one or more processing devices). As used herein, the term "processing device" may refer to any device or portion of a device that processes electronic data from registers and/or memory to transform that electronic data into other electronic data that may be stored in registers and/or memory. The processing device 302 (e.g., electronic processor(s)) may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 300 may include a storage device 304 (e.g., one or more storage devices). The storage device 304 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 304 may include memory that shares a die with a processing device 302. In such an embodiment, the memory may be used as cache memory and may include embedded dynamic random access memory (eDRAM) or spin transfer torque magnetic random access memory (STT-MRAM), for example. In some embodiments, the storage device 304 may include non-transitory computer readable media having instructions thereon that, when executed by one or more processing devices (e.g., the processing device 302), cause the computing device 300 to perform any appropriate ones of or portions of the methods disclosed herein.

The computing device 300 may include an interface device 306 (e.g., one or more interface devices 306). The interface device 306 may include one or more communication chips, connectors, and/or other hardware and software to govern communications between the computing device 300 and other computing devices. For example, the interface device 306 may include circuitry for managing wireless communications for the transfer of data to and from the computing device 300. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 306 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In some embodiments, circuitry included in the interface device 306 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 306 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 306 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 306 may include one or more antennas (e.g., one or more antenna arrays) to receipt and/or transmission of wireless communications.

In some embodiments, the interface device 306 may include circuitry for managing wired communications, such as electrical, optical, or any other suitable communication protocols. For example, the interface device 306 may include circuitry to support communications in accordance with Ethernet technologies. In some embodiments, the interface device 306 may support both wireless and wired communication, and/or may support multiple wired communication protocols and/or multiple wireless communication protocols. For example, a first set of circuitry of the interface device 306 may be dedicated to shorter-range wireless communications such as Wi-Fi or Bluetooth, and a second set of circuitry of the interface device 306 may be dedicated to longer-range wireless communications such as global positioning system (GPS), EDGE, GPRS, CDMA, WiMAX, LTE, EV-DO, or others. In some embodiments, a first set of circuitry of the interface device 306 may be dedicated to wireless communications, and a second set of circuitry of the interface device 306 may be dedicated to wired communications.

The computing device 300 may include battery/power circuitry 308. The battery/power circuitry 308 may include one or more energy storage devices (e.g., batteries or capacitors) and/or circuitry for coupling components of the computing device 300 to an energy source separate from the computing device 300 (e.g., AC line power).

The computing device 300 may include a display device 310 (e.g., multiple display devices). The display device 310 may include any visual indicators, such as a heads-up display, a computer monitor, a projector, a touchscreen display, a liquid crystal display (LCD), a light-emitting diode display, or a flat panel display.

The computing device 300 may include other input/output (I/O) devices 312. The other I/O devices 312 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 300, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 300 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

One or more computing devices implementing any of the scientific instrument support modules or methods disclosed herein may be part of a scientific instrument support system. FIG. 4 is a block diagram of an example scientific instrument support system 400 in which some or all of the scientific instrument support methods disclosed herein may be performed, in accordance with various embodiments. The scientific instrument support modules and methods disclosed herein (e.g., the scientific instrument support module 100 of FIG. 1 and the methods 600 and 800 of FIGS. 6 and 8) may be implemented by one or more of the scientific instrument 410, the user local computing device 420, the service local computing device 430, or the remote computing device 440 of the scientific instrument support system 400.

Any of the scientific instrument 410, the user local computing device 420, the service local computing device 430, or the remote computing device 440 may include any of the embodiments of the computing device 300 discussed herein with reference to FIG. 3, and any of the scientific instrument 410, the user local computing device 420, the service local computing device 430, or the remote computing device 440 may take the form of any appropriate ones of the embodiments of the computing device 300 discussed herein with reference to FIG. 3.

The scientific instrument 410, the user local computing device 420, the service local computing device 430, or the remote computing device 440 may each include a processing device 402, a storage device 404, and an interface device 406. The processing device 402 may take any suitable form, including the form of any of the processing devices 302 discussed herein with reference to FIG. 3, and the processing devices 402 included in different ones of the scientific instrument 410, the user local computing device 420, the service local computing device 430, or the remote computing device 440 may take the same form or different forms. The storage device 404 may take any suitable form, including the form of any of the storage devices 304 discussed herein with reference to FIG. 3, and the storage devices 404 included in different ones of the scientific instrument 410, the user local computing device 420, the service local computing device 430, or the remote computing device 440 may take the same form or different forms. The interface device 406 may take any suitable form, including the form of any of the interface devices 306 discussed herein with reference to FIG. 3, and the interface devices 406 included in different ones of the scientific instrument 410, the user local computing device 420, the service local computing device 430, or the remote computing device 440 may take the same form or different forms.

The scientific instrument 410, the user local computing device 420, the service local computing device 430, and the remote computing device 440 may be in communication with other elements of the scientific instrument support system 400 via communication pathways 408. The communication pathways 408 may communicatively couple the interface devices 406 of different ones of the elements of the scientific instrument support system 400, as shown, and may be wired or wireless communication pathways (e.g., in accordance with any of the communication techniques discussed herein with reference to the interface devices 306 of the computing device 300 of FIG. 3). The particular scientific instrument support system 400 depicted in FIG. 4 includes communication pathways between each pair of the scientific instrument 410, the user local computing device 420, the service local computing device 430, and the remote computing device 440, but this "fully connected" implementation is simply illustrative, and in various embodiments, various ones of the communication pathways 408 may be absent. For example, in some embodiments, a service local computing device 430 may not have a direct communication pathway 408 between its interface device 406 and the interface device 406 of the scientific instrument 410, but may instead communicate with the scientific instrument 410 via the communication pathway 408 between the service local computing device 430 and the user local computing device 420 and the communication pathway 408 between the user local computing device 420 and the scientific instrument 410.

The scientific instrument 410 may include any appropriate scientific instrument, such as an ion chromatograph, a gas chromatograph, a liquid chromatograph, a mass spectrometer, and/or the like.

The user local computing device 420 may be a computing device (e.g., in accordance with any of the embodiments of the computing device 300 discussed herein) that is local to a user of the scientific instrument 410. In some embodiments, the user local computing device 420 may also be local to the scientific instrument 410, but this need not be the case; for example, a user local computing device 420 that is in a user's home or office may be remote from, but in communication with, the scientific instrument 410 so that the user may use the user local computing device 420 to control and/or access data from the scientific instrument 410. In some embodiments, the user local computing device 420 may be a laptop, smartphone, or tablet device. In some embodiments the user local computing device 420 may be a portable computing device.

The service local computing device 430 may be a computing device (e.g., in accordance with any of the embodiments of the computing device 300 discussed herein) that is local to an entity that services the scientific instrument 410. For example, the service local computing device 430 may be local to a manufacturer of the scientific instrument 410 or to a third-party service company. In some embodiments, the service local computing device 430 may communicate with the scientific instrument 410, the user local computing device 420, and/or the remote computing device 440 (e.g., via a direct communication pathway 408 or via multiple "indirect" communication pathways 408, as discussed above) to receive data regarding the operation of the scientific instrument 410, the user local computing device 420, and/or the remote computing device 440 (e.g., the results of self-tests of the scientific instrument 410, calibration coefficients used by the scientific instrument 410, the measurements of sensors associated with the scientific instrument 410, etc.). In some embodiments, the service local computing device 430 may communicate with the scientific instrument 410, the user local computing device 420, and/or the remote computing device 440 (e.g., via a direct communication pathway 408 or via multiple "indirect" communication pathways 408, as discussed above) to transmit data to the scientific instrument 410, the user local computing device 420, and/or the remote computing device 440 (e.g., to update programmed instructions, such as firmware, in the scientific instrument 410, to initiate the performance of test or calibration sequences in the scientific instrument 410, to update programmed instructions, such as software, in the user local computing device 420 or the remote computing device 440, etc.). A user of the scientific instrument 410 may utilize the scientific instrument 410 or the user local computing device 420 to communicate with the service local computing device 430 to report a problem with the scientific instrument 410 or the user local computing device 420, to request a visit from a technician to improve the operation of the scientific instrument 410, to order consumables or replacement parts associated with the scientific instrument 410, or for other purposes.

The remote computing device 440 may be a computing device (e.g., in accordance with any of the embodiments of the computing device 300 discussed herein) that is remote from the scientific instrument 410 and/or from the user local computing device 420. In some embodiments, the remote computing device 440 may be included in a datacenter or other large-scale server environment. In some embodiments, the remote computing device 440 may include network-attached storage (e.g., as part of the storage device 404). The remote computing device 440 may store data generated by the scientific instrument 410, perform analyses of the data generated by the scientific instrument 410 (e.g., in accordance with programmed instructions), facilitate communication between the user local computing device 420 and the scientific instrument 410, and/or facilitate communication between the service local computing device 430 and the scientific instrument 410.

In some embodiments, one or more of the elements of the scientific instrument support system 400 illustrated in FIG. 4 may not be present. Further, in some embodiments, multiple ones of various ones of the elements of the scientific instrument support system 400 of FIG. 4 may be present. For example, a scientific instrument support system 400 may include multiple user local computing devices 420 (e.g., different user local computing devices 420 associated with different users or in different locations). In another example, a scientific instrument support system 400 may include multiple scientific instruments 410, all in communication with service local computing device 430 and/or a remote computing device 440; in such an embodiment, the service local computing device 430 may monitor these multiple scientific instruments 410, and the service local computing device 430 may cause updates or other information may be "broadcast" to multiple scientific instruments 410 at the same time. Different ones of the scientific instruments 410 in a scientific instrument support system 400 may be located close to one another (e.g., in the same room) or farther from one another (e.g., on different floors of a building, in different buildings, in different cities, etc.). In some embodiments, a scientific instrument 410 may be connected to an Internet-of-Things (IoT) stack that allows for command and control of the scientific instrument 410 through a web-based application, a virtual or augmented reality application, a mobile application, and/or a desktop application. Any of these applications may be accessed by a user operating the user local computing device 420 in communication with the scientific instrument 410 by the intervening remote computing device 440. In some embodiments, a scientific instrument 410 may be sold by the manufacturer along with one or more associated user local computing devices 420 as part of a local scientific instrument computing unit 412.

In some embodiments, different ones of the scientific instruments 410 included in a scientific instrument support system 400 may be different types of scientific instruments 410; for example, one scientific instrument 410 may be a chromatograph, while another scientific instrument 410 may be a mass spectrometer. Two or more scientific instruments such as a chromatograph and a mass spectrometer may be physically linked together through a fluid interface. In some such embodiments, the remote computing device 440 and/or the user local computing device 420 may combine data from different types of scientific instruments 410 included in a scientific instrument support system 400.

Figure 5:
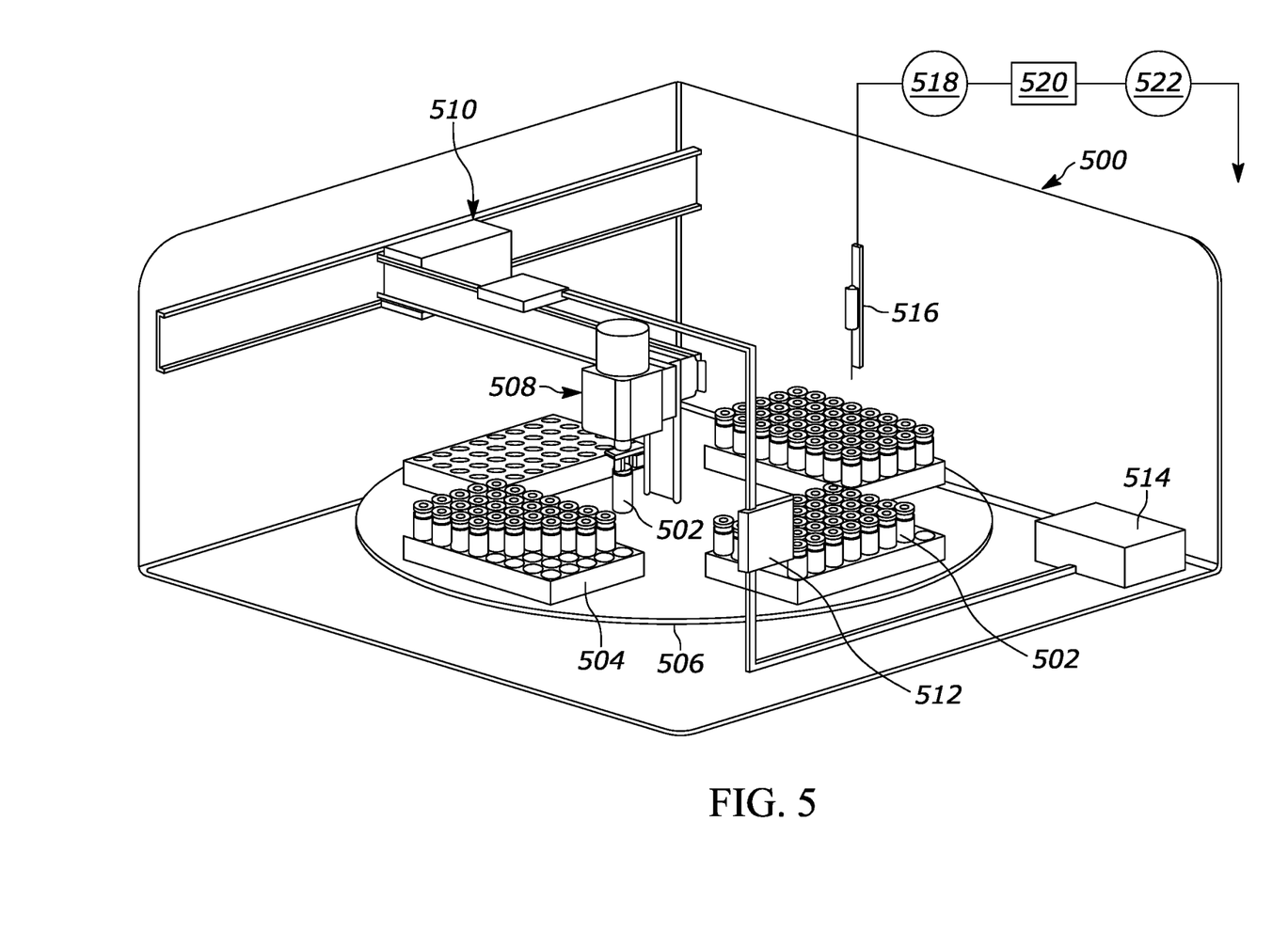
FIG. 5 is a perspective view of an exemplary autosampler used with the scientific instrument support system of FIG. 5, in accordance with various embodiments.

FIG. 5 illustrates one example of an autosampler 500 used with the scientific instruments 410 to retrieve samples from sample containers 502. In the example illustrated, the sample containers 502 are vials. In other examples, the sample containers 502 may include other types of containers. A plurality of sample containers is loaded onto a sample tray 504, which is in turn loaded into the autosampler 500. The autosampler 500 generally includes a carousel 506 or tray support, a container gripper assembly 508 for individually handing the sample containers 502, a gantry 510 to maneuver the container gripper assembly 508, a machine vision (MV) module 512 for scanning an identifier on the sample container 502, and a computing device 514 for controlling the carousel 506, the gripper assembly 508, the gantry 510, and the MV module 512. The computing device 514 may include any of the embodiments of the computing device 300 discussed herein with reference to FIG. 3 and may take the form of any appropriate ones of the embodiments of the computing device 300 discussed herein with reference to FIG. 3.

The carousel 506 may rotate the sample trays 504 to and from a loading position adjacent the gripper assembly 508. The gripper assembly 508 may be configured to selectively grip, lift, and rotate a respective sample container 502 such that the container can be scanned by the MV module 512. The MV module 512 may include a barcode scanner, a camera, and/or other digital imaging devices configured to scan or digitally image an identifier on the sample container 502. FIG. 5 illustrates one example configuration of an autosampler 500 to provide context to the present disclosure. Various different configuration of the autosampler 500 with differing features, for example, without sample trays 504, with a different gripper assembly 508, or the like may also be used without deviating from the scope of the present disclosure.

The autosampler 500 may include a sampling needle assembly 516 that is fluidly connected to a scientific instrument 410 for example, a chromatograph to analyze the constituents of the samples within the sample containers 502. The sampling needle assembly 516 may include a sample injection value 518 to introduce samples to a downstream chromatograph that contains chromatography column 520 and/or a detector 522. The autosampler 500 may have a different configuration of sampling needle assembly 516 based on the scientific instrument supported by the autosampler 500. When loading the autosampler 500 with sample containers 502, the user may use an application for the scientific instrument 410 to select the particular workflow performed on each of the loaded samples. For example, a user may select the workflow for each position within the autosampler 500 in Chromeleon™ chromatography data system (CDS) or other software platform.

Figure 6:
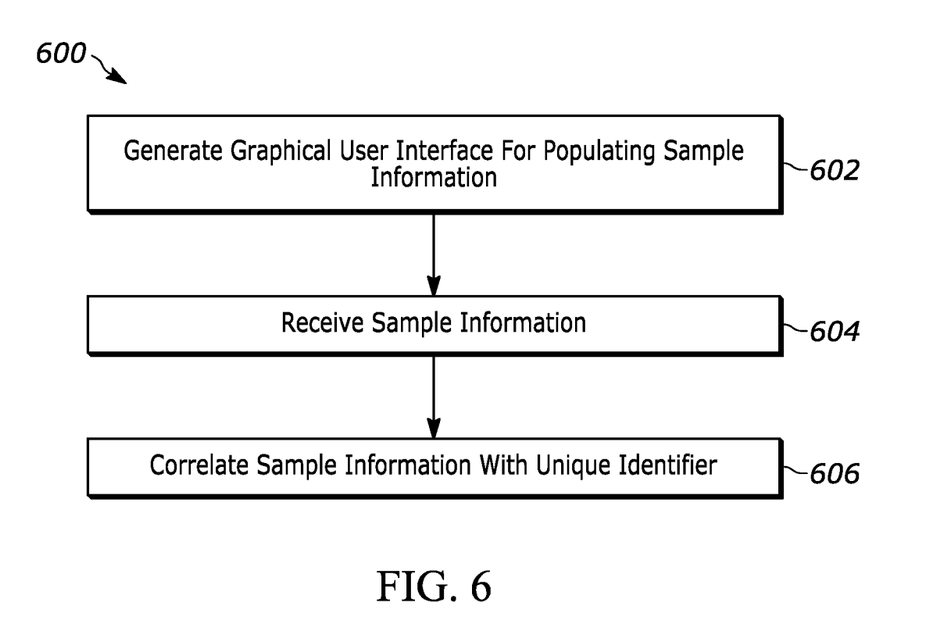
FIG. 6 is a flow diagram of an example method of performing scientific instrument support operations, in accordance with various embodiments.

FIG. 6 is a flow diagram of a method 600 of performing scientific instrument support operations, in accordance with various embodiments. Although the operations of the method 600 may be illustrated with reference to particular embodiments disclosed herein (e.g., the scientific instrument support module 100 discussed herein with reference to FIG. 1, the GUI 200 discussed herein with reference to FIG. 2, the computing device 300 discussed herein with reference to FIG. 3, the scientific instrument support system 400 discussed herein with reference to FIG. 4, and/or the autosampler 500 discussed herein with reference to FIG. 5), the method 600 may be used in any suitable setting to perform any suitable support operations. Operations are illustrated once each and in a particular order in FIG. 6, but the operations may be reordered and/or repeated as desired and appropriate (e.g., different operations performed may be performed in parallel, as suitable).

Figure 7:
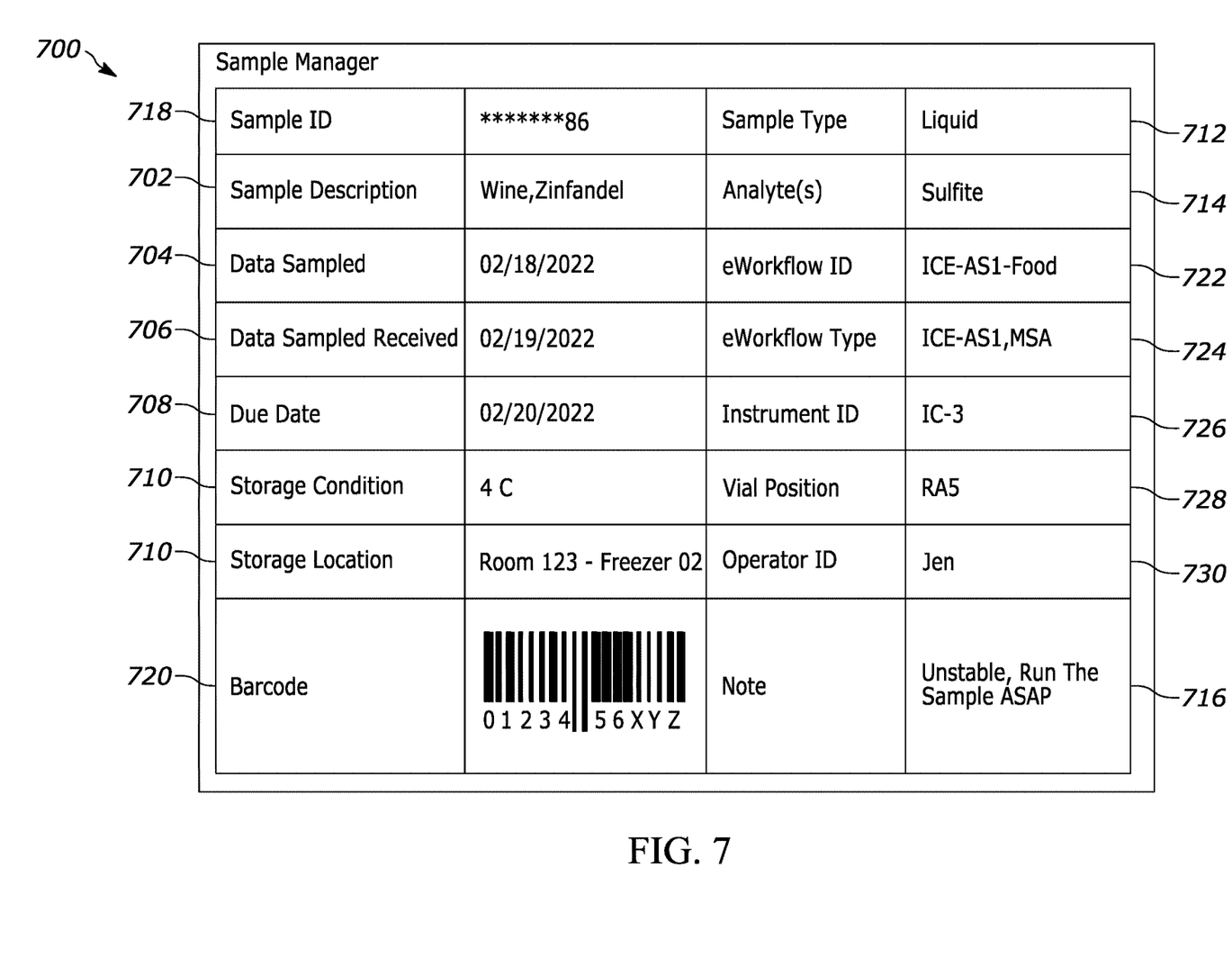
FIG. 7 is an example of a first graphical user interface displayed in the performance of some or all of the scientific instrument support operations disclosed herein, in accordance with various embodiments.

At 602, the method 600 includes generating a graphical user interface (GUI) for populating sample information for a sample. A sample is a substance received at a laboratory for chemical and/or biological analysis. For example, a soil sample may be received for analysis to detect the presence or amount of a nutrient or chemical, a wine sample may be received for analysis to detect the presence or amount of a chemical, or the like. The sample manager logic 102 generates the GUI for collecting information relating to the sample. One example of a sample manager GUI 700 generated by the sample manager logic 102 is illustrated in FIG. 7. The sample manager GUI 700 may be generated after receiving a selection from a user to enter sample information (for example, by performing a clicking action on an enter sample information icon or widget).

At 604, the method 600 includes receiving, via the sample manager GUI 700, the sample information. The sample manager GUI 700 includes several input fields to receive sample information. The input fields illustrated in FIG. 7 are only one example of the sample information that can be received by the support module. In other examples, the sample manager GUI 700 may include more, fewer, or different input fields to receive sample information. In the example illustrated in FIG. 7, the sample information received includes a sample description 702, a date the sample was extracted 704, a date the sample was received 706, a due date for the results of the analysis 708, storage information of the sample 710, a type of the sample 712, a requested analysis of the sample 714, notes relating to the sample 716, and/or the like. The sample manager GUI 700 includes other fields that may be selected by the user or automatically populated based on the user input of the sample information.

At 606, the method 600 includes correlating the sample information with a unique identifier. The sample manager logic 102 may generate a unique identifier for each sample and/or each aliquot of the sample. An aliquot may be prepared from a sample in situations where more than one experiment is to be performed on the sample. To simplify the explanation, the term sample is used herein to refer to both a sample and the sample's aliquots as applicable since every sample may not be aliquoted. The description herein as used with a sample is equally applicable to the aliquots of the sample as appropriate. The unique identifier may be a numeric or alphanumeric identifier. In some examples, a barcode in addition to the numeric or alphanumeric identifier is generated. The sample manager logic 102 may automatically generate the unique identifier and the barcode and populate this information in the sample manager GUI 700 at the sample identifier field 718 and the sample barcode field 720. In one example, the same unique identifier is used for a sample, with each aliquot of the sample sharing the unique identifier. In another example, a different unique identifier is generated for each aliquot of a sample. In some examples, each aliquot of a sample may share a portion of the unique identifier. For example, each aliquot may have a first portion of the identifier that is the same as a general unique identifier assigned to the sample from with the aliquot is prepared. The identifier of the aliquot includes a second portion that is unique to the aliquot appended to the first portion. In some examples, the scientific instrument support module 100 generates a printout of the unique identifier. The printout may be generated on an adhesive backed label that can be attached to a vial or container including the sample or aliquot.

The sample information for each sample or aliquot is then correlated to the unique identifier of that sample or aliquot. This correlation may be performed in, for example, a relational database that stores information in a table. The correlation may also be stored in other ways as can be envisioned by a skilled person in the art. The correlation allows for easy retrieval of sample information as needed, for example, by scanning the bar code provided on a vial of the sample. Additionally, the correlation also allows for easy tracking and chain of custody through the experiments performed by the scientific instruments 410.

Referring to FIG. 7, the sample manager GUI 700 includes additional fields that may selected or input by the user to track the experiments performed on the sample. The sample manager GUI 700 includes a workflow identifier field 722 that allows a user to select a workflow to be performed on the sample. A workflow includes a sequence of methods, tasks, and/or analysis to be performed by a scientific instrument 410 to complete an experiment or analysis. Each scientific instrument 410 may have several default and user-created workflows that may be categorized based on the type of sample, the type of analyte, the type of experiment, the type of scientific instrument, the pre-treatment performed on the sample, and/or the like. The workflow identifier field 722 may include a dropdown menu of the workflows available for the analyte provided in the analyte field 714. The sample manager logic 102 receives, via the sample manager GUI 700, a selection of an analyte for the sample from the user. The sample manager logic 102 automatically populates a plurality of workflows for the sample in response to receiving the selection of the analyte. The plurality of workflows correspond to the analyte. The plurality of workflows are populated, for example, in the dropdown menu of the workflow identifier field 722. In some examples, the workflow identifier may be received by other means, for example, typed in by a user or automatically selected based on other information relating to the sample.

The sample manager logic 102 receives, via the GUI 700, a selection of a workflow from the plurality of workflows. For example, the user clicks on the desired workflow to be performed on the sample in the drop down menu of the workflow identifier field 722. The sample manager logic 102 automatically populates workflow information in response to receiving the selection of the workflow. The workflow information includes, for example, a workflow type, a scientific instrument 410 within the lab that is available to perform the experiment. The workflow type may be populated in the workflow type field 724 and an identifier of the scientific instrument may be populated in the instrument identifier field 726. In some examples, the sample manager logic 102 may also automatically populate position information for the sample in the vial position field 728 in response to receiving the selection of the workflow. The position information corresponds to a position within an autosampler of the scientific instrument 410 where the container including the sample is to be placed. In one example, the autosampler includes trays within which vials containing samples are received. The position information may correspond to the tray and the position within the tray where the sample is to be placed. The vial position field 728 may be an editable field such that the user may specify different position information than the vial position automatically populated by the sample manager logic 102. For example, the sample manager logic 102 receives, via the sample manager GUI 700 an input for a new position information for the sample. The sample manager logic 102 changes the position information from the automatically populated position information to the new position information.

In some examples, the sample manager GUI 700 may include additional fields that may automatically populated or specified by a user. For example, an operator identifier field 730 may be provided on the sample manager GUI 700 to specify the laboratory technician performing the experiment.

Figure 8:
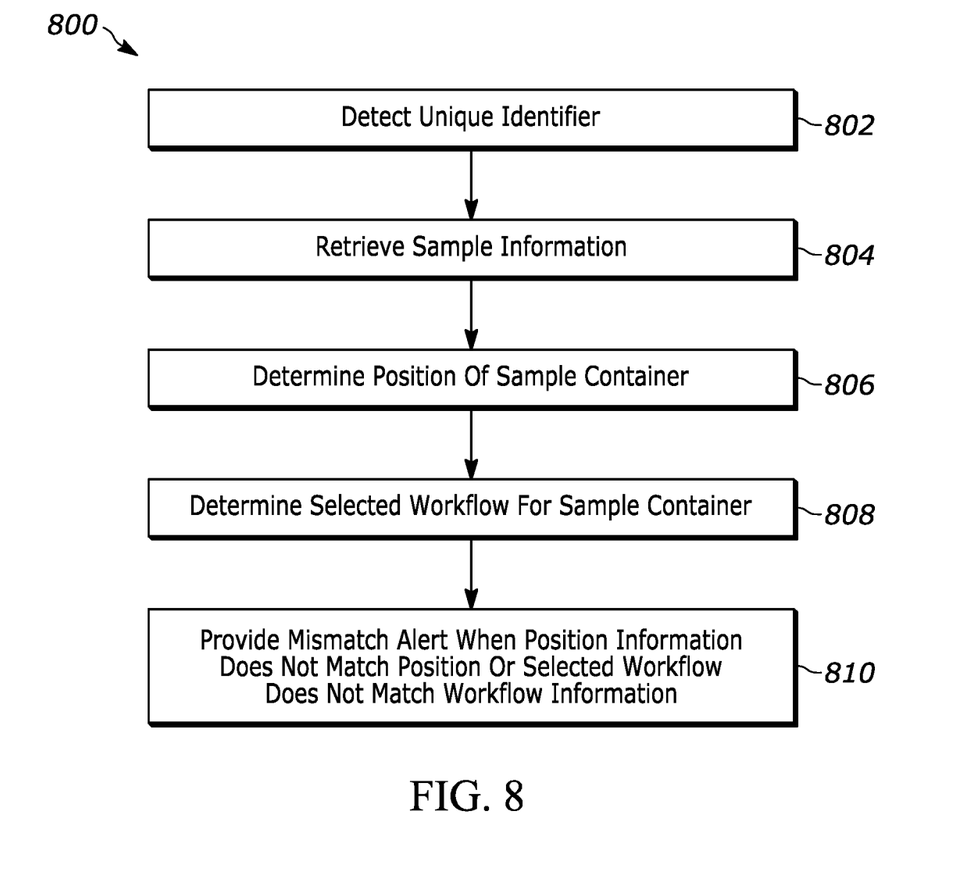
FIG. 8 is a flow diagram of an example method of performing scientific instrument support operations, in accordance with various embodiments.

FIG. 8 is a flow diagram of a method 800 of performing scientific instrument support operations, in accordance with various embodiments. Although the operations of the method 800 may be illustrated with reference to particular embodiments disclosed herein (e.g., the scientific instrument support module 100 discussed herein with reference to FIG. 1, the GUI 200 discussed herein with reference to FIG. 2, the computing device 300 discussed herein with reference to FIG. 3, the scientific instrument support system 400 discussed herein with reference to FIG. 4, and/or the autosampler 500 discussed herein with reference to FIG. 5), the method 800 may be used in any suitable setting to perform any suitable support operations. Operations are illustrated once each and in a particular order in FIG. 8, but the operations may be reordered and/or repeated as desired and appropriate (e.g., different operations performed may be performed in parallel, as suitable).

At 802, the method 800 includes detecting, using the autosampler 500, a unique identifier of a sample container 502. The sample container 502 includes the sample to be analyzed by the scientific instrument 410 corresponding to the autosampler. For example, the autosampler 500 may use the MV module 512 to detect the unique identifier of the sample container. The autosampler application logic 104 controls the MV module 512 to capture the identifier and uses known barcode and image processing techniques to determine the unique identifier from the capture.

At 804, the method 800 includes retrieving position information and workflow information corresponding to the unique identifier. The autosampler application logic 104 uses the unique identifier to retrieve the sample information of the sample in the sample container 502. As noted above, sample information of each sample is correlated with the unique identifier of the sample and stored. The detected unique identifier may be used as a search term to locate and retrieve the sample information corresponding to the unique identifier. The sample information includes the position information and the workflow information for the sample. In some examples, other techniques may be used to retrieve the position information and workflow information corresponding to the unique identifier.

At 806, the method 800 includes determining a position of the sample container 502 in the autosampler 500. The autosampler application logic 104 determines the location where the sample container 502 is positioned within the autosampler. The autosampler application logic 104 may identify the sample tray 504 and the position on the sample tray 504 where the sample container is located. The position information may be detected based on the location of the sample tray 504 and the position on the sample tray 504 from which the gripper assembly 508 of the autosampler 500 retrieved the sample container. Other techniques may be used to determine the position information, for example, depending on the configuration of the autosampler 500 used.

At 808, the method 800 includes determining a selected workflow for the sample container 502. The autosampler application logic 104 may determine the workflow selected by the user for the position where the sample container 502 is located. In some examples, the selected workflow may be detected by other means.

At 810, the method 800 provides, on a user interface (for example, GUI 200), a mismatch alert when the position information does not match the position of the sample container 502 or the selected workflow does not match the workflow information for the sample container 502. The autosampler application logic 104 compares the position information and the workflow information from sample information with the position of the sample container 502 and the workflow selected for the sample container 502 in the scientific instrument application (e.g., Chromeleon™). When the autosampler application logic 104 an alert is provided on the GUI 200 to notify a user of a mismatch. In some examples, only the position mismatch or only the workflow mismatch may be determined and alerted.

When there is no mismatch, the autosampler 500 and the scientific instrument 410 run the selected workflow for the sample. For example, the experiment manager logic 106 runs the selected workflow when the selected workflow matches the workflow information for the sample. In some examples, the autosampler application logic 104 or the experiment manager logic 106 may also determine whether the selected workflow can be performed based on the current configuration of the scientific instrument or the consumables (e.g., chromatography column, detector, etc.) loaded into the scientific instrument. When the selected workflow cannot be performed due to, for example, a consumable mismatch, the experiment manager logic 106 may provide a second mismatch alert. The second mismatch alert indicates that the current configuration or the consumables of the scientific instrument 410 do not match the selected workflow.

In some examples, a check is also performed with respect to the components (including the consumables) of the scientific instrument. Each component or consumable installed on the instrument may have a unique identifier (e.g., a second unique identifier) associated with the component or the consumable. The experiment manager logic 106 determines the unique identifier of the component (e.g., a component or consumable of the scientific instrument). For example, the scientific instrument may include a machine vision module (e.g., a second machine vision module) that is configured to scan the unique identifier of each of the components and determine whether the components are properly installed on the scientific instrument. The experiment manager logic 106 may determine whether the correct type of component is installed based on the unique identifier. The experiment manager logic 106 may also determine whether the component is correctly installed (e.g., in the designated position, in the designated configuration, with proper seals between the component and the scientific instrument, or the like) on the scientific instrument. In some examples, the experiment manager logic 106 also verifies whether the components are in working condition (i.e., not expired, not exhausted, or the like). For example, the experiment manager logic 106 may determine that a wrong type of or an expired eluent generator cartridge (EGC) is installed on the scientific instrument. The experiment manager logic 106 may provide an alert (e.g., second alert) when the component is incorrectly installed or not in working condition.

Figure 9:
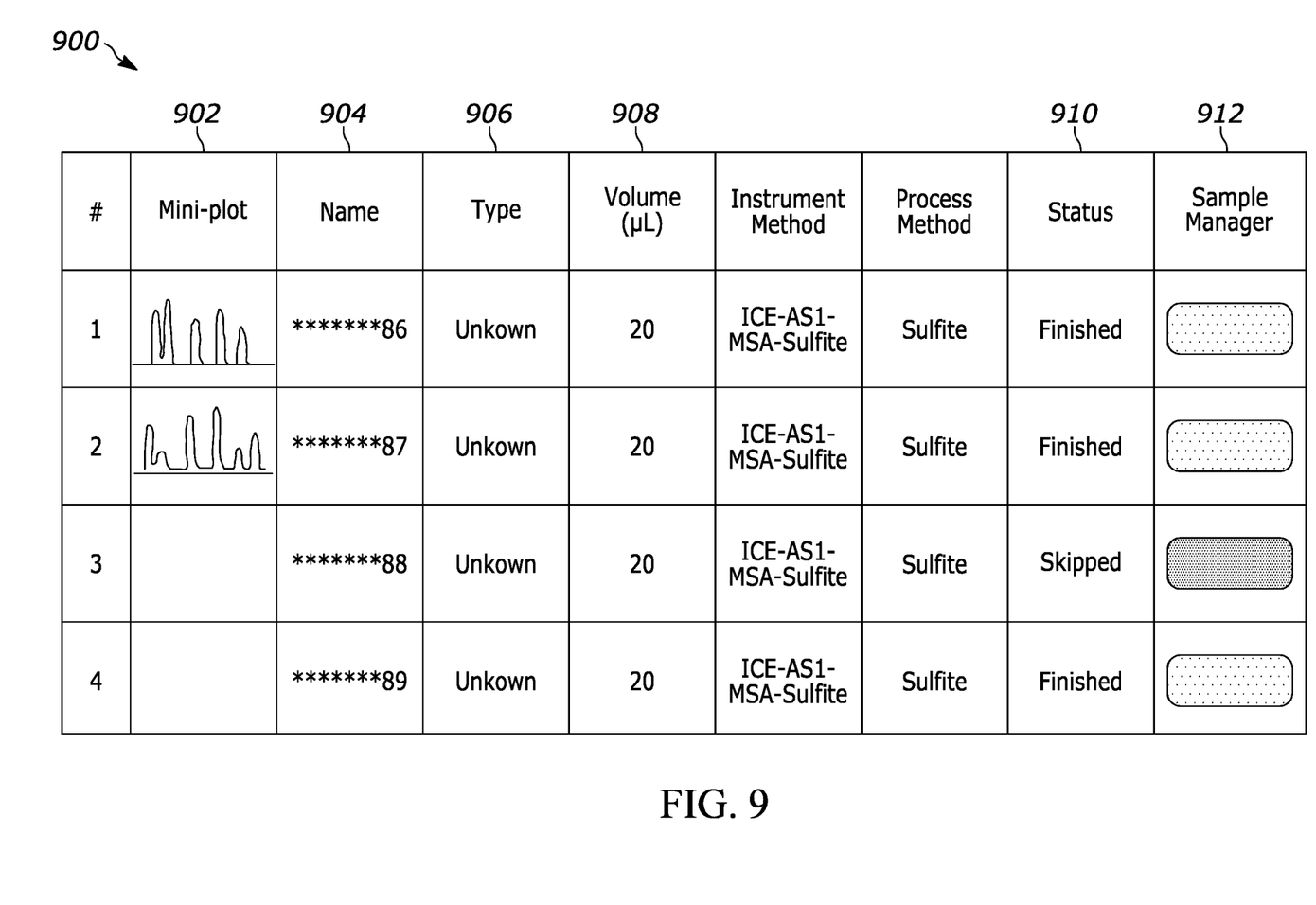
FIG. 9 is an example of a second graphical user interface displayed in the performance of some or all of the scientific instrument support operations disclosed herein, in accordance with various embodiments.

Referring to FIG. 9, in some examples, the experiment manager logic 106 generates a sample listing graphical user interface (GUI) 900 including a sequence table listing a plurality of workflows performed by scientific instrument 410. Each listing of the sequence table corresponds to one of the plurality of workflows. Each listing includes a link to sample information corresponding to a unique identifier associated with the corresponding one of the plurality of workflows. As each workflow is performed, the experiment manager logic 106 populates the sequence table listing. The sequence table listing may include the workflows performed in order. The sequence table listing may also be sortable based on the various categories of the listing (e.g., unique identifier, analyte, status, etc.). The sample listing GUI 900 may be displayed as a table include a plot of the analysis 902, a name or unique identifier of the sample 904, a type of the sample 906, a volume of the sample analyzed 906, a type of workflow performed 908, status of the workflow 910, and a link to the sample information 912. The link to the sample information 912 may also indicate the status of the workflow. The link to sample information 912 may include a first indication (for example, a button with a first color) when a workflow corresponding to the link is successfully performed and a second indication (for example, a button with a second color) when the workflow corresponding to the link is skipped, for example, due to an error or a mismatch.

The following paragraphs provide various examples of the embodiments disclosed herein.

Example 1 is a method for providing scientific instrument support including detecting, using an autosampler, a unique identifier of a sample container. The sample container includes a sample to be analyzed by a scientific instrument corresponding to the autosampler. The method also includes retrieving position information and workflow information corresponding to the unique identifier and determining a position of the sample container in the autosampler. The method further includes determining a selected workflow for the sample container and providing, on a user interface, an alert in response to one selected from a group consisting of the position information not matching the position and the selected workflow not matching the workflow information.

Example 2 may include the subject matter of Example 1, and the method may further include generating a graphical user interface for populating sample information for the sample, and receiving, via the graphical user interface, the sample information. The method may also include correlating the sample information with the unique identifier.

Example 3 may include the subject matter of Example 2, and the method may also include receiving, via the graphical user interface, a selection of an analyte for the sample and automatically populating, in the graphical user interface, a plurality of workflows for the sample in response to receiving the selection of the analyte. The plurality of workflows correspond to the analyte.

Example 4 may include the subject matter of Example 3, and the method may also include receiving a selection of a workflow from the plurality of workflows, and automatically populating, in the graphical user interface, the workflow information in response to receiving the selection of the workflow. The workflow information includes a workflow type and a scientific instrument automatically selected to perform the workflow.

Example 5 may include the subject matter of Example 4, and the method may also include automatically populating, in the graphical user interface, position information in response to receiving the selection of the workflow.

Example 6 may include the subject matter of Example 5, and the method may also include receiving new position information and changing the position information from the automatically populated position information to the new position information.

Example 7 may include the subject matter of any of Examples 1-6, where detecting the unique identifier may include capturing, using a machine vision module of the autosampler, an image of a code printed on the sample container and determining, using the machine vision module, the unique identifier from the image.

Example 8 may include the subject matter of any of Examples 1-7, and the method may also include generating a graphical user interface including a sequence table listing a plurality of workflows of a scientific instrument. Each listing of the sequence table corresponds to one of the plurality of workflows, and each listing includes a link to sample information corresponding to a unique identifier associated with the corresponding one of the plurality of workflows. The link to sample information includes a first indication when a workflow corresponding to the link is successfully performed and a second indication when the workflow corresponding to the link is skipped.

Example 9 may include the subject matter of any of Examples 1-8, where the unique identifier is a first unique identifier and the alert is a first alert, and the method may also include determining a second unique identifier of a component of the scientific instrument and determining whether the component is correctly installed based on the second unique identifier. The method may further include providing, on the user interface, a second alert in response to the component being incorrectly installed.

Example 10 may include one or more non-transitory computer readable media having instructions thereon that, when executed by one or more processing devices of a scientific instrument support apparatus, cause the scientific instrument support apparatus to perform the subject matter of Examples 1-10.

Example 11 may include a scientific instrument support apparatus having an autosampler application logic configured to detect a unique identifier of a sample container. The sample container includes a sample to be analyzed by a scientific instrument corresponding to an autosampler. The autosampler application logic is also configured to retrieve workflow information corresponding to the unique identifier and determine a selected workflow for the sample container. The autosampler application logic is further configured to provide, on a user interface, an alert in response to the selected workflow not matching the workflow information.

Example 12 may include the subject matter of Example 11, and the scientific instrument support apparatus may also include a sample manager logic configured to generate a graphical user interface for populating sample information for the sample and receive, via the graphical user interface, the sample information. The sample manager logic is also configured to correlate the sample information with the unique identifier.

Example 13 may include the subject matter of Example 12, and the sample manager logic is also configured to receive, via the graphical user interface, a selection of an analyte for the sample and automatically populate, in the graphical user interface, a plurality of workflows for the sample in response to receiving the selection of the analyte. The plurality of workflows correspond to the analyte. The sample manager logic is further configured to receive a selection of a workflow from the plurality of workflows and automatically populate, in the graphical user interface, the workflow information in response to receiving the selection of the workflow. The workflow information includes a workflow type and a scientific instrument automatically selected to perform the workflow.

Example 14 may include the subject matter of any of Examples 11-13, and the scientific instrument support apparatus may also include an experiment manager logic configured to run, using a scientific instrument, the selected workflow when the selected workflow matches the workflow information.

Example 15 may include the subject matter of any of Examples 11-14, and the scientific instrument support apparatus may also include an experiment manager logic configured to an experiment manager logic configured to generate a graphical user interface including a sequence table listing a plurality of workflows of a scientific instrument. Each listing of the sequence table corresponds to one of the plurality of workflows, and each listing includes a link to sample information corresponding to a unique identifier associated with the corresponding one of the plurality of workflows.

Example 16 may include a system for performing scientific instrument support including an electronic computing device including an electronic processor. The electronic processor is configured to detect a unique identifier of a sample container, the sample container including a sample to be analyzed by a scientific instrument corresponding to an autosampler and retrieve position information corresponding to the unique identifier. The electronic processor is also configured to determine a position of the sample container in the autosampler and provide, on a user interface, an alert in response to the position information not matching the position.

Example 17 may include the subject matter of Example 16, and the electronic processor is further configured to generate a graphical user interface for populating sample information for the sample and receive, via the graphical user interface, the sample information. The electronic processor is also configured to correlate the sample information with the unique identifier.

Example 18 may include the subject matter of Example 17 and the electronic processor is further configured to receive, via the graphical user interface, a selection of an analyte for the sample and automatically populate a plurality of workflows for the sample in response to receiving the selection of the analyte. The plurality of workflows correspond to the analyte. The electronic processor is also configured to receive a selection of a workflow from the plurality of workflows and automatically populate position information in response to receiving the selection of the workflow.

Example 19 may include the subject matter of Example 18, and the electronic processor is further configured to receive a new position information and change the position information from the automatically populated position information to the new position information.

Example 20 may include the subject matter of any of Examples 16-19, and the electronic processor is further configured to generate a graphical user interface including a sequence table listing a plurality of workflows of a scientific instrument. Each listing of the sequence table corresponds to one of the plurality of workflows, and each listing includes a link to sample information corresponding to a unique identifier associated with the corresponding one of the plurality of workflows. The link to sample information includes a first indication when a workflow corresponding to the link is successfully performed and a second indication when the workflow corresponding to the link is skipped.

The invention claimed is:

1. A method for providing scientific instrument support, comprising: capturing, using a machine vision module of an autosampler, an image of a code printed on a sample container, the sample container including a sample to be analyzed by a scientific instrument corresponding to the autosampler;
determining, using the machine vision module, the unique identifier from the image;
retrieving position information and workflow information corresponding to the unique identifier;
determining a position of the sample container in the autosampler;
determining a selected workflow for the sample container;
providing, on a user interface, a first alert in response to the position information not matching the position; and
providing, on the user interface, a second alert in response to the selected workflow not matching the workflow information.

2. The method of claim 1, further comprising:
generating a graphical user interface for populating sample information for the sample;
receiving, via the graphical user interface, the sample information; and
correlating the sample information with the unique identifier.

3. The method of claim 2, further comprising:
receiving, via the graphical user interface, a selection of an analyte for the sample; and
automatically populating, in the graphical user interface, a plurality of workflows for the sample in response to receiving the selection of the analyte, the plurality of workflows corresponding to the analyte.

4. The method of claim 3, further comprising:
receiving a selection of a workflow from the plurality of workflows; and
automatically populating, in the graphical user interface, the workflow information in response to receiving the selection of the workflow, the workflow information including a workflow type and a scientific instrument automatically selected to perform the workflow.

5. The method of claim 4, further comprising automatically populating, in the graphical user interface, position information in response to receiving the selection of the workflow.

6. The method of claim 5, further comprising:
receiving new position information; and
changing the position information from the automatically populated position information to the new position information.

7. The method of claim 1, further comprising:
generating a graphical user interface including a sequence table listing a plurality of workflows of a scientific instrument, wherein each listing of the sequence table corresponds to one of the plurality of workflows, and wherein each listing includes a link to sample information corresponding to a unique identifier associated with the corresponding one of the plurality of workflows, wherein the link to sample information includes a first indication when a workflow corresponding to the link is successfully performed and a second indication when the workflow corresponding to the link is skipped.

8. The method of claim 1, wherein the unique identifier is a first unique identifier, further comprising:
determining a second unique identifier of a component of the scientific instrument;
determining whether the component is correctly installed based on the second unique identifier; and
providing, on the user interface, a third alert in response to the component being incorrectly installed.

9. One or more non-transitory computer readable media having instructions thereon that, when executed by one or more processing devices of a scientific instrument support apparatus, cause the scientific instrument support apparatus to perform the method of claim 1.

10. A scientific instrument support apparatus, comprising:
autosampler application logic configured to:
capture, using a machine vision module of an autosampler, an image of a code printed on a sample container, the sample container including a sample to be analyzed by a scientific instrument corresponding to the autosampler;

determine, using the machine vision module, the unique identifier from the image;

retrieve workflow information corresponding to the unique identifier;

determine a selected workflow for the sample container; and provide, on a user interface, an alert in response to the selected workflow not matching the workflow information.

11. The scientific instrument support apparatus of claim 10, further comprising:
a sample manager logic configured to:
generate a graphical user interface for populating sample information for the sample;
receive, via the graphical user interface, the sample information; and
correlate the sample information with the unique identifier.

12. The scientific instrument support apparatus of claim 11, wherein the sample manager logic is further configured to:
receive, via the graphical user interface, a selection of an analyte for the sample;
automatically populate, in the graphical user interface, a plurality of workflows for the sample in response to receiving the selection of the analyte, the plurality of workflows corresponding to the analyte;
receive a selection of a workflow from the plurality of workflows; and
automatically populate, in the graphical user interface, the workflow information in response to receiving the selection of the workflow, the workflow information including a workflow type and a scientific instrument automatically selected to perform the workflow.

13. The scientific instrument support apparatus of claim 10, further comprising:
an experiment manager logic configured to run, using a scientific instrument, the selected workflow when the selected workflow matches the workflow information.

14. The scientific instrument support apparatus of claim 10, further comprising:
an experiment manager logic configured to generate a graphical user interface including a sequence table listing a plurality of workflows of a scientific instrument, wherein each listing of the sequence table corresponds to one of the plurality of workflows, and wherein each listing includes a link to sample information corresponding to a unique identifier associated with the corresponding one of the plurality of workflows.

15. A system for performing scientific instrument support, the system comprising:
an electronic computing device including an electronic processor, the electronic processor configured to:
capture, using a machine vision module of an autosampler, an image of a code printed on a sample container, the sample container including a sample to be analyzed by a scientific instrument corresponding to the autosampler;
determine, using the machine vision module, the unique identifier from the image;
retrieve position information and workflow information corresponding to the unique identifier;
determine a position of the sample container in the autosampler;
determine a selected workflow for the sample container;
provide, on a user interface, a first alert in response to the position information not matching the position; and
provide, on a user interface, a second alert in response to the selected workflow not matching the workflow information.

16. The system of claim 15, wherein the electronic processor is further configured to:
generate a graphical user interface for populating sample information for the sample;
receive, via the graphical user interface, the sample information; and
correlate the sample information with the unique identifier.

17. The system of claim 16, wherein the electronic processor is further configured to:
receive, via the graphical user interface, a selection of an analyte for the sample;
automatically populate a plurality of workflows for the sample in response to receiving the selection of the analyte, the plurality of workflows corresponding to the analyte;
receive a selection of a workflow from the plurality of workflows; and
automatically populate position information in response to receiving the selection of the workflow.

18. The system of claim 17, wherein the electronic processor is further configured to:
receive a new position information; and
change the position information from the automatically populated position information to the new position information.

19. The system of claim 15, wherein the electronic processor is further configured to:
generate a graphical user interface including a sequence table listing a plurality of workflows of a scientific instrument, wherein each listing of the sequence table corresponds to one of the plurality of workflows, and wherein each listing includes a link to sample information corresponding to a unique identifier associated with the corresponding one of the plurality of workflows, wherein the link to sample information includes a first indication when a workflow corresponding to the link is successfully performed and a second indication when the workflow corresponding to the link is skipped.

* * * * *